April 8, 1924.

C. BAKER

WEIGHT FOR HORSE BLANKETS

Filed Sept. 21, 1923

1,489,301

Inventor
Cecil Baker

By Lester L. Sargent
Attorney

Patented Apr. 8, 1924.

1,489,301

UNITED STATES PATENT OFFICE.

CECIL BAKER, OF EDMUNDS, NORTH DAKOTA.

WEIGHT FOR HORSE BLANKETS.

Application filed September 21, 1923. Serial No. 664,070.

*To all whom it may concern:*

Be it known that I, CECIL BAKER, a citizen of the United States, residing at Edmunds, in the county of Stutsman and State of North Dakota, have invented a new and useful Weight for Horse Blankets, of which the following is a specification.

The object of my invention is to provide an improved device for holding horse blankets or fly nets in place without exerting unnecessary weight or strain on the blanket or net. I attain these and other objects of my invention by the device illustrated in the accompanying drawings, in which—

Like characters of reference indicate like parts in the accompanying drawings.

Figure 1:
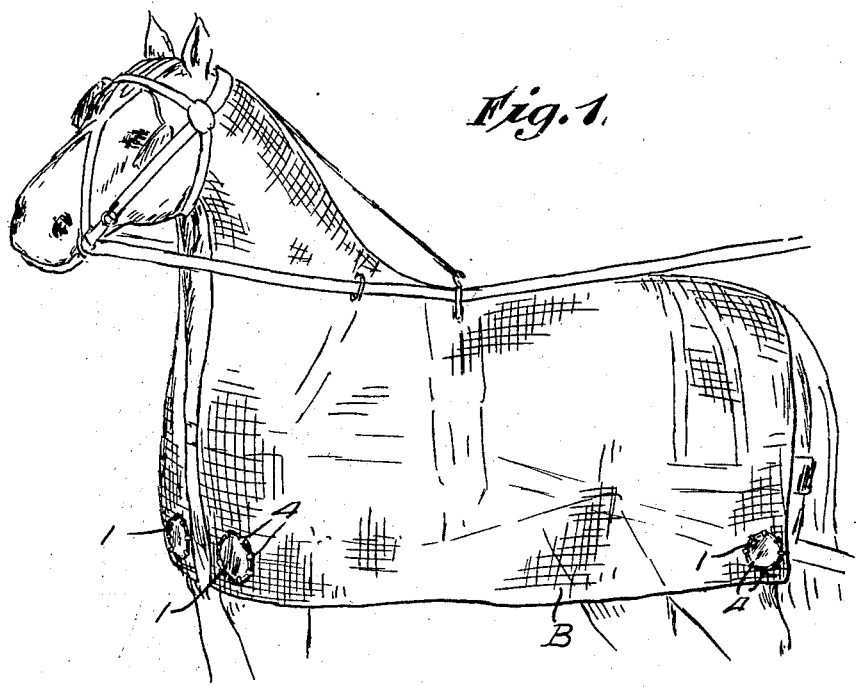
Fig. 1 is a perspective view of the device applied to a horse blanket or fly net.

Referring to the drawings, I provide a suitable weight 1, having an annular depression 2. I provide a disk 3 of slightly larger size but having its outer edge corresponding in shape with the shape of weight 1. Disk 3 is provided with spaced ears 4.

Figure 2:
Fig. 2 is a detail sectional view of my invention in use.
Figure 3:
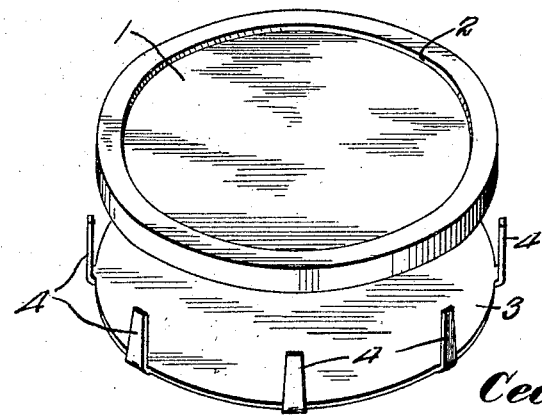
Fig. 3 is a perspective view of the device with its members detached from each other.

In use the weight 1 is applied to one side of the horse blanket or fly net and the disk 3 to the opposite side. The ears or prongs 4 are inserted through the blanket or fly net and bent over weight 1 as shown in Fig. 2, with their ends 5 turned downwardly in the depression 2, which is suitably positioned to admit of the positioning of the points as shown in Fig. 2. The weight is cheaply made and easily secured or removed from the blanket or fly net. It provides an even pull without unnecessary strain on the blanket and no unnecessary weight on the horse as sometimes occurs when the net is fastened to the traces and the pull is downward. As the weight is flat it will not catch on anything and be torn out. It holds the blanket whether the horse be hitched up or unhitched. It can be readily transferred from one blanket to another. The depression 2 in which the ends 5 of prongs 4 seat prevents the prongs from getting caught and pulled out when in use.

What I claim is:

1. In a weight for horse blankets and fly nets, the combination of a flat weight member, a disk of substantially the same area as the weight member, the disk having spaced prongs of suitable length for insertion through the blanket or fly net and for being bent into engagement with the weight member.

2. In a weight for horse blankets and fly nets, the combination of a flat weight element, said element having an annular depressed portion, a disk having spaced prongs, said prongs being of suitable length to engage around the edges of the weight element and have their ends down-turned into its depressed portion to prevent the prongs from catching and being bent out of their normal engagement with the weight element.

CECIL BAKER.